(12) United States Patent
Hu et al.

(10) Patent No.: US 9,187,616 B2
(45) Date of Patent: Nov. 17, 2015

(54) RESIN COMPOSITIONS

(71) Applicant: Ashland Licensing and Intellectual Property LLC, Dublin, OH (US)

(72) Inventors: Jie Hu, Dublin, OH (US); Robin F Righettini, Dublin, OH (US); Timothy P Pepper, Hilliard, OH (US)

(73) Assignee: ASHLAND LICENSING AND INTELLECTUAL PROPERTY LLC, Dublin, OH (US)

( * ) Notice: Subject to any disclaimer, the term of this patent is extended or adjusted under 35 U.S.C. 154(b) by 0 days.

(21) Appl. No.: 14/064,576

(22) Filed: Oct. 28, 2013

(65) Prior Publication Data

US 2014/0121313 A1   May 1, 2014

Related U.S. Application Data

(60) Provisional application No. 61/719,575, filed on Oct. 29, 2012.

(51) Int. Cl.

| | | |
|---|---|---|
| *C08K 3/26* | (2006.01) | |
| *C08K 3/34* | (2006.01) | |
| *C08K 3/36* | (2006.01) | |
| *C08K 3/22* | (2006.01) | |
| *C08K 5/00* | (2006.01) | |
| *C08L 63/00* | (2006.01) | |

(52) U.S. Cl.
CPC ... *C08K 3/26* (2013.01); *C08K 3/22* (2013.01); *C08K 3/34* (2013.01); *C08K 3/346* (2013.01); *C08K 3/36* (2013.01); *C08K 5/0091* (2013.01); *C08L 63/00* (2013.01)

(58) Field of Classification Search
USPC .................. 524/425, 437, 451, 357
See application file for complete search history.

(56) References Cited

U.S. PATENT DOCUMENTS

| | | | |
|---|---|---|---|
| 6,818,149 | B2 | 11/2004 | Boerzel |
| 7,659,327 | B2 | 2/2010 | Aufderheide |
| 8,039,559 | B2 | 10/2011 | Jansen |
| 8,287,848 | B2 | 10/2012 | Mehta |
| 2003/0230736 | A1 | 12/2003 | Hage |
| 2004/0014625 | A1 | 1/2004 | Comba |
| 2005/0032662 | A1 | 2/2005 | Boerzel |
| 2007/0001343 | A1* | 1/2007 | Pulman et al. ................. 264/255 |
| 2007/0004613 | A1 | 1/2007 | Ouwendijk-Vrijenhoek |
| 2007/0004614 | A1 | 1/2007 | Ouwendijk-Vrijenhoek |
| 2007/0173427 | A1 | 7/2007 | Hage |
| 2007/0225443 | A1 | 9/2007 | Skelskey |
| 2008/0035885 | A1 | 2/2008 | Hage |
| 2009/0137728 | A1* | 5/2009 | Sumner et al. ................. 524/563 |
| 2010/0029859 | A1* | 2/2010 | Jansen et al. .................. 525/360 |
| 2010/0069548 | A1 | 3/2010 | Jansen |
| 2010/0069549 | A1 | 3/2010 | Jansen |
| 2010/0069575 | A1* | 3/2010 | Jansen ........................ 525/329.5 |
| 2011/0277665 | A1 | 11/2011 | Hage |

FOREIGN PATENT DOCUMENTS

| | | | |
|---|---|---|---|
| EP | 2343336 | 7/2011 | |
| WO | 0060045 | 10/2000 | |
| WO | 0248301 | 6/2002 | |
| WO | 2005047364 | 5/2005 | |
| WO | 2005059075 | 6/2005 | |
| WO | 2005121296 | 12/2005 | |
| WO | 2006133773 | 12/2006 | |
| WO | 2006133790 | 12/2006 | |
| WO | 2008003492 | 1/2008 | |
| WO | 2008003493 | 1/2008 | |
| WO | 2008003497 | 1/2008 | |
| WO | 2008003498 | 1/2008 | |
| WO | 2008003500 | 1/2008 | |
| WO | 2010006861 | 1/2010 | |
| WO | 2011083309 | 7/2011 | |
| WO | WO 2011083309 A1 * | 7/2011 | ............... C08K 9/00 |
| WO | 2011124282 | 10/2011 | |
| WO | 2011157673 | 12/2011 | |
| WO | 2012079624 | 6/2012 | |
| WO | 2012093250 | 7/2012 | |

OTHER PUBLICATIONS

Written Opinion of the International Searching Authority dated Feb. 27, 2014.

* cited by examiner

*Primary Examiner* — Vu A Nguyen

(74) *Attorney, Agent, or Firm* — William J. Davis

(57) ABSTRACT

Compositions comprising unsaturated resin and catalyst comprising transition metal, such as a complex of ligands and transition metals. The compositions may further comprise filler or rheology modifiers.

15 Claims, No Drawings

RESIN COMPOSITIONS

CROSS REFERENCE TO RELATED APPLICATIONS

This application claims the benefit of U.S. Patent Application No. 61/719,575, filed Oct. 29, 2012. U.S. Patent Application No. 61/719,575 is incorporated herein in its entirety by reference.

BACKGROUND OF THE INVENTION

1. Field of the Invention

The invention concerns compositions comprising ethylenically unsaturated resin compositions having improved stability with respect to room temperature gel ("RTG") time drift and stability against gellation compared to conventional systems.

2. The Related Art

Resin compositions, such as unsaturated polyester resin ("UPR"), and vinyl ester resin ("VER") are typically combined or blended with filler, such as aluminum trihydroxide ("ATH") with different particle sizes and surface treatment, calcium carbonate, and talc to lower the total cost and achieve desired functions, such as modulus, better resistance to abrasion, and flame retardant properties in case of ATH. Quite often, resin compositions also include rheology modification additives, such as fumed silica with different surface area and surface treatment to achieve desired properties, such as sag resistance. These compositions are used to make molded composite articles. Typically, the molded composite article is formed by contact molding, such as hand layup, spray up, and infusion, which comprises the resin and filler material and a fibrous material, e.g. glass fibers, embedded into a polymer matrix. While the mechanical properties of a bundle of fibers are low, the strength of the individual fibers is reinforced by the polymer matrix that acts as an adhesive and binds the fibers together. The bound fibers provide rigidity and impart structural strength to the molded composite article, while the polymeric matrix prevents the fibers from separating when the molded composite article is subjected to environmental stress.

Obtaining thorough cure and consistent curing behavior in a highly filled system or compositions with rheology modification additives can be a challenge for several reasons. First, the filler acts as a heat sink. This reduces the temperature of the curing composite which both slows the rate of cure and can allow vitrification which nearly stops reaction completely. Cure of composites is most commonly initiated by the catalytic decomposition of hydroperoxides, where metal salts provide the catalysis. These metal salts are present at low levels, and so may be adsorbed onto the surface of inorganic filler or additives. Also, acid or base on the surface of the filler or additive particles or present as an extractable can change the rate of radical production. Such systems are very often subject to changes in gel time on storage.

Several approaches to address the changes in RTG time drift have been proposed in the art and each has several drawbacks. For example, cobalt catalyst and co-promoters may be added to the resin immediately before use. While this approach diminishes, and in some cases eliminates, the problems associated with RTG time drift, the use of cobalt and co-promoters increases complexity of product use at the fabricator. For example, fabricators weigh and manipulate chemicals, and cobalt presents some environmental and toxic challenges. Another approach is to add a partially soluble cobalt compound, commercially known as cobalt 21%. This material slowly releases cobalt on storage, replenishing the cobalt that is absorbed by filler. While sometimes this is difficult to reproduce, in theory this allows the gel time drift to be zero at any point in time—but not at all points. The rates of neither the 'release' of new cobalt, nor the 'deactivation' of existing cobalt are steady. The two can not be matched. In addition, since this approach utilizes cobalt, careful formulation is needed to minimize RTG time drift and the cobalt presents environmental and toxic challenges. Vanadium has also been used in the art, but this material presents the same drawbacks as cobalt.

All parts and percentages set forth herein are on a weight-by-weight basis except where otherwise specified, for example by weight of the resin, meaning by the amount of all resin (UPR, VER, and/or other resins having ethylenic unsaturation) in the composition.

SUMMARY OF THE INVENTION

The composition comprises unsaturated resin and catalyst. In an embodiment the composition further comprises filler, and may also include dispersing agents. In another embodiment, the composition comprises rheology modifiers. The unsaturated resin composition may also comprise other components and additives typically found in such compositions.

The unsaturated resin compositions are typically used in combination with fibrous reinforcement to manufacture composite structures. Typically, the unsaturated resin compositions are used in contact molding, such as hand layup, spray up, and infusion. For example, in contact molding the unsaturated resin composition may be applied by hand to wet out fiberglass reinforcement in a mold, and this step may be repeated to make two or more layers of fiberglass reinforcement within the molded article. The resin is cured to make a fiber reinforced composite article. In a spray up procedure the unsaturated resin composition is applied by spray to the fiberglass reinforcement within a mold to make the molded article. The reinforcement or rovings are either combined with the unsaturated resin composition after the resin exits the spray gun or the rovings and resin are combined prior to spraying and then sprayed into the mold. With infusion, the fiber reinforcement is placed into a mold and then the unsaturated resin composition is drawn and infused into the mold generally by way of a vacuum environment created in the mold.

DETAILED DESCRIPTION OF THE INVENTION

The compositions comprise resin and catalyst. The unsaturated resin compositions may also comprise filler. In addition, particularly but not necessarily in filled resin compositions, the compositions may also comprise dispersing agents. In an embodiment, the compositions comprise, rheology-modifiers, particularly in compositions comprising little or no filler. Optionally, the unsaturated resin composition comprises components and additives typically included in such resin compositions.

Preferably the resin is UPR, or VER, although other resins having ethylenic unsaturation are within the scope of the invention. These resins are characterized by a polymerizable C=C double bond, generally in conjugation with a carbonyl bond.

UPR and VER, and methods for formulating UPR and VER, are well known in the art. For example, UPR is typically prepared from dicarboxylic functional monomers, or mixture of di- or greater carboxyl functional monomers where at least one of which contains ethylenic unsaturation. These polyesters are obtained by the condensation of the carboxylic acid monomers with polyhydric alcohols. The polyester is dissolved in a reactive monomer, such as styrene, to obtain a solution that may then be crosslinked. Typically, VER is made from the reaction of carboxylic acids and epoxies, such as reacting monocarboxylic acids, like acrylic acid and methacrylic acid or dicarboxylic acids with polyepoxide resins or reacting dicarboxylic acid half esters of hydroxyalkyl acrylates or methacrylates with polyepoxide resins. VER is also based on epoxy novolac resins. One skilled in the art will appreciate that there are many different processes and methods for making UPR, VER, and other resins having ethylenic unsaturation that may be applied within the scope of the invention.

UPRs are made of an ethylenically unsaturated polycarboxylic acid or its corresponding anhydride and optionally other acids with a polyol in the presence of a condensation and/or isomerization catalyst or reacts the completed UPR with a saturated monohydric alcohol, optionally in the presence of a transesterification catalyst. Examples of dicarboxylic acids and corresponding anhydrides containing ethylenic unsaturation useful in the invention include dicarboxylic acids and corresponding anhydrides such as itaconic anhydride, maleic acid, fumaric acid, itaconic acid and maleic anhydride. Examples of other useful acids and anhydrides include adipic acid, phthalic acid, isophthalic acid, terephthalic acid, tetrahydrophthalic anhydride, phthalic anhydride, nadic anhydride, methylnadic anhydride, hexahydrophthalic anhydride, dimethyl terephthalate, recycled terephthalate (PET) and the like. Examples of polyols and glycols include ethylene glycol, propylene glycol, 1,3-propanediol, 1,4-propanediol, 1,4-butanediol, 2,2-dimethyl-1,3-propanediol, 2-methyl-1,3-propanediol, glycol ethers such as diethylene glycol and dipropylene glycol, and polyoxyalkylene glycol. Triols and higher functional polyols such as glycerol, trimethylol propane and oxyalkylated adducts thereof can also be used.

Bisphenol-A-fumarates resins based on ethoxylated bisphenol-A and fumaric acid may be used in the resin composition. Also, chlorendics prepared from chlorine containing anhydrides or glycols or triols in the preparation of the UPR may be used. Dicyclopentadiene ("DCPD") UPR resins obtained either by modification of any of the above resin types via Diels-Alder reaction with cyclopentadiene, or obtained by first reacting a diacid, such as maleic acid, with dicyclopentadiene, followed by the usual steps for manufacturing UPR, further referred to as DCPD-maleate resin may also be used.

VER is mostly used because of its hydrolytic resistance and excellent mechanical properties. VER has polymerizable unsaturated sites, predominantly in the terminal position, and is prepared by reaction of epoxy oligomers or polymers (e.g. diglycidyl ether of bisphenol-A, epoxies of the phenol-novolac type, or epoxies based on tetrabromobisphenol-A) with for example (meth)acrylic acid or (meth)acrylamide. VER is an oligomer or polymer containing at least one (meth)acrylate functional end group, also known as (meth)acrylate functional resins. This also includes the class of vinyl ester urethane resins (also referred to as urethane(meth)acrylate resins) which are typically prepared from reaction of isocyanates, hydroxyl acrylates or methacyrlates. These VER resins, often, contain reactive monomers, such as styrene, methyl methacrylate, or other methacrylates or acrylates. In addition, VER resins include those obtained by reaction of an epoxy oligomer or polymer with methacrylic acid or methacrylamide, preferably with methacrylic acid.

Generally, the acid value of the unsaturated resin is about 5 to about 40. Persons of ordinary skill in these arts, after reading this disclosure, will appreciate that all ranges and values for the catalyst within the explicitly stated ranges above are contemplated.

Typically, the resins are used in combination with reactive diluents. Styrene is traditionally used as the reactive diluent. However, other materials may be used in place of styrene, such as substituted styrene, mono-, di- and polyfunctional esters of monofunctional acids with alcohols or polyols, mono-, di- and polyfunctional esters of unsaturated monofunctional alcohols with carboxylic acids or their derivatives, acrylates and the like.

Filler typically used in the resin compositions include ATH, calcium carbonate, talc and the like, and combinations thereof. ATH of various particle sizes and surface treatments may be used, such as MICRAL® 932 and MICRAL 916 available from Huber Engineered Materials ("Huber"), Atlanta, Ga., U.S.A. The filler materials are generally selected with respect to cost and desired functionality, for example in applications where fire retardant properties are desired ATH is used as the predominant filler in the resin composition. The composition will generally comprise filler in amounts of about 10% to about 250%, preferably about 50% to about 200%, by weight of resin, like about 75% to about 125% by weight of resin. Persons of ordinary skill in these arts, after reading this disclosure, will appreciate that all ranges and values for the amount of filler within the explicitly stated ranges above are contemplated.

The catalyst preferably comprises a transition metal, such as iron. Such iron catalysts include ferric acetoacetonate. A particular catalyst comprises ligand, including complexes of the ligand and transition metals, like those disclosed in U.S. Pat. No. 6,818,149 which is incorporated by reference herein in its entirety. For example, WXP-126 catalyst available from the OM Group Inc., Cleveland, Ohio, U.S.A. ("OMG") may be used in the composition. Generally, the catalyst is present in the composition in amounts less than about 1% by weight of the resin, preferably less than about 0.1% by weight of the resin. Typically, the resin composition will comprise catalyst in an amount of about 0.01% to about 0.25% by weight of the resin. Persons of ordinary skill in these arts, after reading this disclosure, will appreciate that all ranges and values for the catalyst within the explicitly stated ranges above are contemplated.

Typically, the ligand has the following structure.

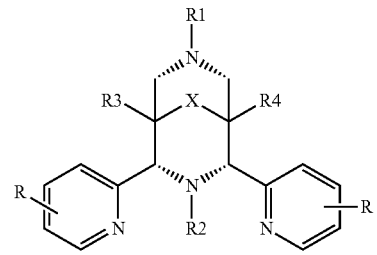

wherein each R is independently selected from hydrogen, F, Cl, Br, hydroxyl, $C_1$-$C_4$-alkylO—, —NH—CO—H, —NH$_2$—CO—$C_1$-$C_4$-alkyl, —NH$_2$, —NH—$C_1$-$C_4$-alkyl and $C_1$-$C_4$-alkyl; R1 and R2 are independently selected from $C_1$-$C_4$-alkyl, $C_6$-$C_{10}$-aryl, and a group containing a heteroatom capable of coordinating to a transition metal; R3 and R4 are independently selected from hydrogen, $C_1$-$C_8$ alkyl, $C_1$-$C_8$-alkyl-O—$C_1$-$C_8$-alkyl, $C_1$-$C_8$-alkyl-O—$C_6$-$C_{10}$-aryl, $C_1$-$C_8$-hydroxyalkyl, and —(CH$_2$)$_n$C(O)OR$_5$ wherein R5 is independently selected from hydrogen, $C_1$-$C_6$-alkyl and combinations thereof and n is from 0 to 4; and, X is selected from C=O, —[C(R6)$_2$]$_y$—wherein Y is from 0 to 3 and each R6 is independently selected from hydrogen, hydroxyl, $C_1$-$C_4$-alkoxy and $C_1$-$C_4$-alkyl. In an embodiment at least one of R1 and R2 is the group containing the heteroatom. The ligand forms a complex with one or more transition metals, for example as a dinuclear complex. Suitable transition metals include manganese in oxidation states II-V, iron in oxidation states II-V, copper in oxidation states I-III, cobalt in oxidation states I-III, titanium in oxidation states II-IV, tungsten in oxidation states IV-VI, vanadium in oxidation states II-V, molybdenum in oxidation states II-VI and the like, and combinations thereof. Manganese in oxidation states II-V, iron in oxidation states II-V, copper in oxidation states I-Ill, titanium in oxidation states II-IV, tungsten in oxidation states IV-VI, molybdenum in oxidation states II-VI and iron in oxidation states II-V are the most preferred. These transition metals may be complexed with the ligand described above, or with other ligands within the scope of the invention.

The resin composition may further comprise dispersing agents, which are chemicals that aid in the dispersion of solid components in the resin composition, in other words enhance the dispersion of solid components in the unsaturated resin. Useful dispersing agents include copolymers comprising acidic functional groups like BYK®—W 996 available for Byk USA, Inc., Wallingford, Conn., U.S.A. ("Byk"), unsaturated polycarboxylic acid polymer comprising polysiloxane copolymer, like BYK®—W 995 available from Byk, copolymer comprising acidic functional groups, like BYK®—W 9011 available from Byk, copolymer comprising acidic functional groups, like BYK®—W 969 available from Byk and alkylol ammonium salt of an acidic polyester. Combinations of dispersing agents may be used. Such dispersing agents comprising acidic functional groups are not generally compatible with cobalt systems due to incompatibility between the acidic functional groups and cobalt. The resin composition may comprise up to about 3% dispersing agent by weight of the resin, such as up to about 2% by weight of the resin and preferably about 0.1% to about 3% by weight of the resin. Persons of ordinary skill in these arts, after reading this disclosure, will appreciate that all ranges and values for the dispersing agent within the explicitly stated ranges above are contemplated. Aspects of the invention involve the use of the dispersing agent in conjunction with filler in which case the dispersing agent, such as those mentioned above, aid, i.e. enhance, in the dispersion of the filler in the unsaturated resin.

The composition can comprise a co-promoter to enhance cure of the resin composition. Co-promoters useful in the invention include 2,4-petanedione ("2,4-PD"), 2-acetylbutyrolactone, ethyl acetoacetate, n,n-diethyl acetoacetamide and the like, and combinations thereof.

The resin composition may also comprise rheology modifiers. Typical rheology modifiers include fumed silica, organic clay and combinations thereof. Generally, rheology modifiers are used in unsaturated resin compositions comprising little or no filler and/or dispersing agents.

In addition, the resin composition may comprise additives typically used in UPR, VER and other resins having ethylenic unsaturation. For example, synergist agents may be incorporated into the resin compositions. These synergist agents include polysorbate 20 (Tween 20), polyhydroxycarboxylic acid esters, such as BYK®—R605 and R606 available from Byk and the like, and combinations thereof.

The resin composition has better RTG time drift than other resin systems. Also, the resin composition has better anti-gellation stability than conventional systems in long term storage. Without wishing to be bound by any theory, the inventors believe that these properties are the result of the synergistic combination of the particular filler and catalyst.

EXAMPLES

Comparative Examples A/B and Examples 1 and 2

VER compositions comprising MODAR® 816-A resin available from Ashland Inc., Dublin, Ohio U.S.A. ("Ashland") were made by blending the components set forth in Table 1. Comparative examples A and B comprise 0.3% by weight of the resin cobalt catalyst whereas Examples 1 and 2 comprise no cobalt but have WXP-126 catalyst and 2,4-PD co-promoter. The VER compositions were allowed to stand at room temperature and the RTG time for each resin composition was noted. The results for the RTG time are described in Table 2.

TABLE 1

| Components (parts) | Comparative A | Comparative B | Example 1 | Example 2 |
|---|---|---|---|---|
| MODAR 816A | 100 | 100 | 100 | 100 |
| MICRAL 932 | 100 | — | 100 | — |
| SB-805 | — | 100 | — | 100 |
| AEROSIL ® 200 | 0.4 | 0.4 | 0.4 | 0.4 |
| Cobalt | 0.3 | 0.3 | — | — |
| DMA | 0.05 | 0.05 | — | — |
| WXP-126 | — | — | 0.06 | 0.06 |
| 2,4-PD | — | — | 0.1 | 0.1 |

Notes:
SB-805 is ATH available from Huber Engineered Materials, Atlanta, Georgia U.S.A.
AEROSIL 200 is fumed silica available from EVONIK ® Industries, Essen Germany.
DMA is dimethylaniline.

TABLE 2

| Examples | Room Temperature Gel Time (min) | Room Temperature Gel Time after 1 week storage at 110° F. (min) |
|---|---|---|
| Comparative A | not curable | Not curable |
| Comparative B | 69.4 | Not curable |
| Example 1 | 6.6 | 5.2 |
| Example 2 | 7.4 | 6.7 |

Comparative Examples C/D and Examples 3 and 4

VER compositions were made by blending the components set forth in Table 3. Comparative examples C and D comprise 0.3% by weight of the resin 6% cobalt catalyst from OMG whereas Examples 3 and 4 comprise no cobalt but have WXP-126 catalyst and 2,4-PD co-promoter. MODAR 816-A resin from Ashland and SB 632 ATH from Huber were used. The VER compositions were allowed to stand at room temperature and the RTG time for each resin composition was noted. The results for the RTG time are described in Table 4.

TABLE 3

| Components (parts) | Comparative C | Comparative D | Example 3 | Example 4 |
|---|---|---|---|---|
| MODAR 816-A | 100 | 100 | 100 | 100 |
| SB632 | 100 | 100 | 100 | 100 |
| 6% Cobalt | 0.3 | 0.3 | — | — |
| DMA | 0.05 | 0.05 | — | — |
| WXP-126 | — | — | 0.06 | 0.06 |

TABLE 3-continued

| Components (parts) | Comparative C | Comparative D | Example 3 | Example 4 |
|---|---|---|---|---|
| 2,4-PD | — | — | 0.1 | 0.1 |
| BYK-996 | 1 | 0 | 1 | 0 |

TABLE 4

| Examples | Room Temperature Gel Time (min) |
|---|---|
| Comparative A | >600 |
| Comparative B | 30 |
| Example 3 | 3.9 |
| Example 4 | 4.0 |

Notes:
SB632 is ATH available from Huber Engineered Materials, Atlanta, Georgia U.S.A.

Comparative Example E and Example 5

UPR compositions were made by blending the components set forth in Table 5. Comparative example E comprises 0.2% by weight of the resin 6% cobalt catalyst from OMG whereas Example 5 comprises no cobalt but has WXP-126 catalyst and 2,4-PD co-promoter. AROPOL® 7221 resin from Ashland is used. RTG time for these UPR compositions was noted when fresh after formulation. Samples of the compositions were sealed and then opened at 1, 3, 7, 21 and 90 days after formulation and allowed to stand at room temperature and noted for RTG time. The results for the RTG time are described in Table 6.

TABLE 5

| Components (parts) | Comparative E | Example 5 |
|---|---|---|
| AROPOL 7221 | 82.92 | 82.99 |
| Styrene | 16.07 | 16.10 |
| 6% Cobalt | 0.2 | — |
| DEA | 0.05 | — |
| WXP-126 | — | 0.06 |
| 2,4-PD | — | 0.1 |
| AEROSIL 200 | 0.5 | 0.5 |

Notes:
DEA is diethylaniline.

TABLE 6

| RTG (min) after storage | Comparative E | Example 5 |
|---|---|---|
| Fresh | 13.6 | 8.1 |
| 1 day | 13.4 | 8.1 |
| 3 days | 14.7 | 7.6 |
| 7 days | 18.1 | 5.7 |
| 21 days | 23.6 | 6.9 |
| 90 days | 28.2 | 6.2 |

Comparative Examples F, G and H and Examples 5, 6 and 7

UPR compositions were made by blending the components set forth in Table 7. Comparative examples F, G and H comprise 0.2% by weight of the resin 6% cobalt catalyst from OMG whereas Examples 5, 6 and 7 comprise no cobalt but have WXP-126 catalyst and 2,4-PD co-promoter. AROPOL 7221 resin from Ashland, BYK 996 and 968 from BYK and w-4 calcium carbonate from Huber were used.

TABLE 7

| Components (parts) | Comparative F | Comparative G | Comparative H | Example 5 | Example 6 | Example 7 |
|---|---|---|---|---|---|---|
| AROPOL 7221 | 82.92 | 82.92 | 82.92 | 82.99 | 82.99 | 82.99 |
| Styrene | 16.07 | 16.07 | 16.07 | 16.10 | 16.10 | 16.10 |
| 6% Cobalt | 0.2 | 0.2 | 0.2 | — | — | — |
| DEA | 0.05 | 0.05 | 0.05 | — | — | — |
| WXP-126 | — | — | — | 0.06 | 0.06 | 0.06 |
| 2,4-PD | — | — | — | 0.1 | 0.1 | 0.1 |
| AEROSIL 200 | 0.5 | 0.5 | 0.5 | 0.5 | 0.5 | 0.5 |
| BYK-996 | — | 1 | — | — | 1 | — |
| BYK-968 | — | — | 1 | — | — | 1 |
| Calcium carbonate | 100 | 100 | 100 | 100 | 100 | 100 |

Comparative Examples F, G and H and Examples 5, 6 and 7 were tested for Brookfield viscosity, room temperature gel and Peak Exotherm using conventional procedures. The results are set forth in Table 8.

TABLE 8

| Examples | Brookfield Viscosity (LVT, #3@30 rpm) | Room Temperature Gel Time (min) | Peak Exotherm (° F.) |
|---|---|---|---|
| Comparative F | 2,720 | 13.7 | 239.4 |
| Comparative G | 1,880 | No gel | No gel |
| Comparative H | 2,260 | 280.3 | 92.6 |
| Example 5 | 2,900 | 2.4 | 213.7 |
| Example 6 | 2,420 | 7.4 | 203.9 |
| Example 7 | 2,380 | 2.5 | 208.7 |

We claim:

1. A composition comprising a resin having ethylenic unsaturation, a filler in the amount of about 10% to about 250% by weight of the resin, and a catalyst comprising either a complex of a transition metal and a ligand or ferric acetoacetonate wherein the ligand comprises a structure

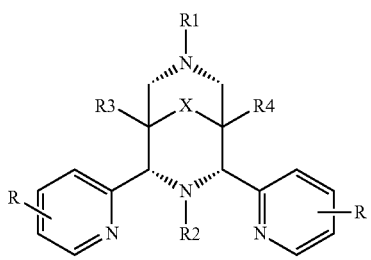

wherein, each R is independently selected from: hydrogen, F, Cl, Br, hydroxyl, $C_1$-$C_4$-alkylO—, —NH—CO—H, —NH—CO—$C_1$-$C_4$-alkyl, —$NH_2$, —NH—$C_1$-$C_4$-alkyl, and $C_1$-$C_4$-alkyl;

R1 and R2 are independently selected from: $C_1$-$C_4$-alkyl, $C_6$-$C_{10}$-aryl, and, a group containing a heteroatom capable of coordinating to a transition metal wherein at least one of R1 and R2 is the group containing the heteroatom and the transition metal is selected from the group consisting of manganese in oxidation states II-V, iron in oxidation states II-V, copper in oxidation states I-III, cobalt in oxidation states I-III, titanium in oxidation states II-IV, tungsten in oxidation states IV-VI, vanadium in oxidation states II-V, molybdenum in oxidation states II-VI and combinations thereof;

R3 and R4 are independently selected from hydrogen, $C_1$-$C_8$ alkyl, $C_1$-$C_8$-alkyl-O—$C_1$-$C_8$-alkyl, $C_1$-$C_8$-alkyl-O—$C_6$-$C_{10}$-aryl, $C_6$-$C_{10}$-aryl, $C_1$-$C_8$-hydroxyalkyl, and —$(CH_2)_n$C(O)$OR_5$ and R5 is independently selected from hydrogen, $C_1$-$C_6$-alkyl and mixtures thereof and n is from 0 to 4;

X is selected from C=O, —[C(R6)$_2$]$_y$— wherein Y is from 0 to 3 and each R6 is independently selected from hydrogen, hydroxyl, $C_1$-$C_4$-alkoxy and $C_1$-$C_4$-alkyl; and wherein said composition further comprises a co-promoter selected from the group consisting of 2,4-pentanedione, 2-acetylbutyrolactone, ethyl acetoacetate, n,n-diethyl acetoacetamide and combinations thereof.

2. The composition of claim 1 wherein resin having ethylenic unsaturation has an acid value of about 5 to about 40.

3. The composition of claim 1 wherein the resin having ethylenic unsaturation is an unsaturated polyester resin or a vinyl ester resin.

4. The composition of claim 1 wherein the filler is selected from the group consisting of aluminum trihydroxide, calcium carbonate, talc and combinations thereof.

5. The composition of claim 1 comprising about 50% to about 200% filler by weight of the resin.

6. The composition of claim 1 comprising about 0.01% to about 0.25% catalyst by weight of the resin.

7. The composition of claim 1 further comprising a dispersing agent.

8. The composition of claim 7 wherein the dispersing agent comprises copolymers having an acidic functional group, unsaturated polycarboxylic polymer comprising polysiloxane copolymer or alkylol ammonium salt of an acidic polyester.

9. The composition of claim 7 wherein the dispersing agent is present in an amount of about 0.1% to about 3% by weight of the resin.

10. The composition of claim 1 further comprising a rheology modifier selected from the group consisting of fumed silica, organic clay and combinations thereof.

11. The composition of claim 1 further comprising polysorbate 20, polyhydroxycarboxylic acid esters and combinations thereof.

12. A composition comprising a resin having ethylenic unsaturation, a rheology modifier and a catalyst comprising either a complex of a transition metal and a ligand or ferric acetoacetonate wherein the ligand comprises a structure

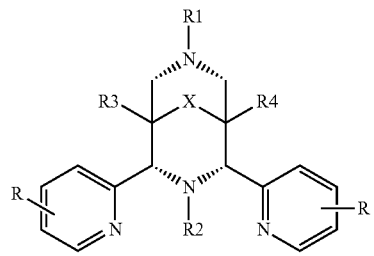

wherein, each R is independently selected from: hydrogen, F, Cl, Br, hydroxyl, $C_1$-$C_4$-alkylO—, —NH—CO—H, —NH—CO—$C_1$-$C_4$-alkyl, —$NH_2$, —NH—$C_1$-$C_4$-alkyl, and $C_1$-$C_4$-alkyl;

R1 and R2 are independently selected from: $C_1$-$C_4$-alkyl, $C_6$-$C_{10}$-aryl, and, a group containing a heteroatom capable of coordinating to a transition metal wherein at least one of R1 and R2 is the group containing the heteroatom and the transition metal is selected from the group consisting of manganese in oxidation states II-V, iron in oxidation states II-V, copper in oxidation states I-III, cobalt in oxidation states I-III, titanium in oxidation states II-IV, tungsten in oxidation states IV-VI, vanadium in oxidation states II-V, molybdenum in oxidation states II-VI and combinations thereof;

R3 and R4 are independently selected from hydrogen, $C_1$-$C_8$ alkyl, $C_1$-$C_8$-alkyl-O—$C_1$-$C_8$-alkyl, $C_1$-$C_8$-alkyl-O—$C_6$-$C_{10}$-aryl, $C_6$-$C_{10}$-aryl, $C_1$-$C_8$-hydroxyalkyl, and —$(CH_2)_n$C(O)$OR_5$ and R5 is independently selected from hydrogen, $C_1$-$C_6$-alkyl and mixtures thereof and n is from 0 to 4;

X is selected from C=O, —[C(R6)$_2$]$_y$— wherein Y is from 0 to 3 and each R6 is independently selected from hydrogen, hydroxyl, $C_1$-$C_4$-alkoxy and $C_1$-$C_4$-alkyl; and wherein said composition further comprises a co-promoter selected from the group consisting of 2,4-pentanedione, 2-acetylbutyrolactone, ethyl acetoacetate, n,n-diethyl acetoacetamide and combinations thereof.

13. The composition of claim 12 wherein the rheology modifier is selected from the group consisting of fumed silica, organic clay and combinations thereof.

14. The composition of claim 12 wherein the resin having ethylenic unsaturation is an unsaturated polyester resin or a vinyl ester resin.

15. The composition of claim 12 comprising about 0.01% to about 0.25% catalyst by weight of the resin.

* * * * *